Oct. 31, 1961

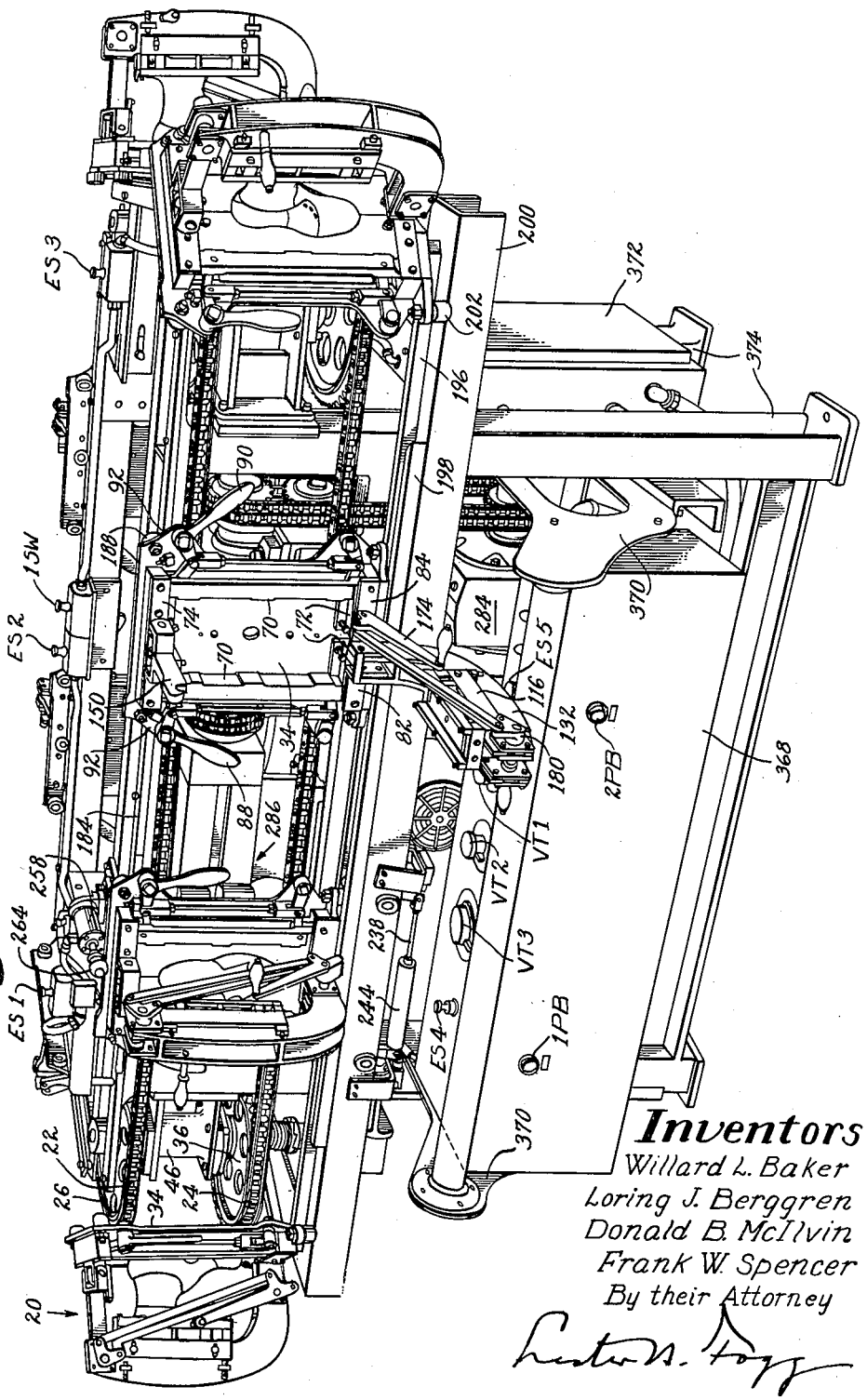

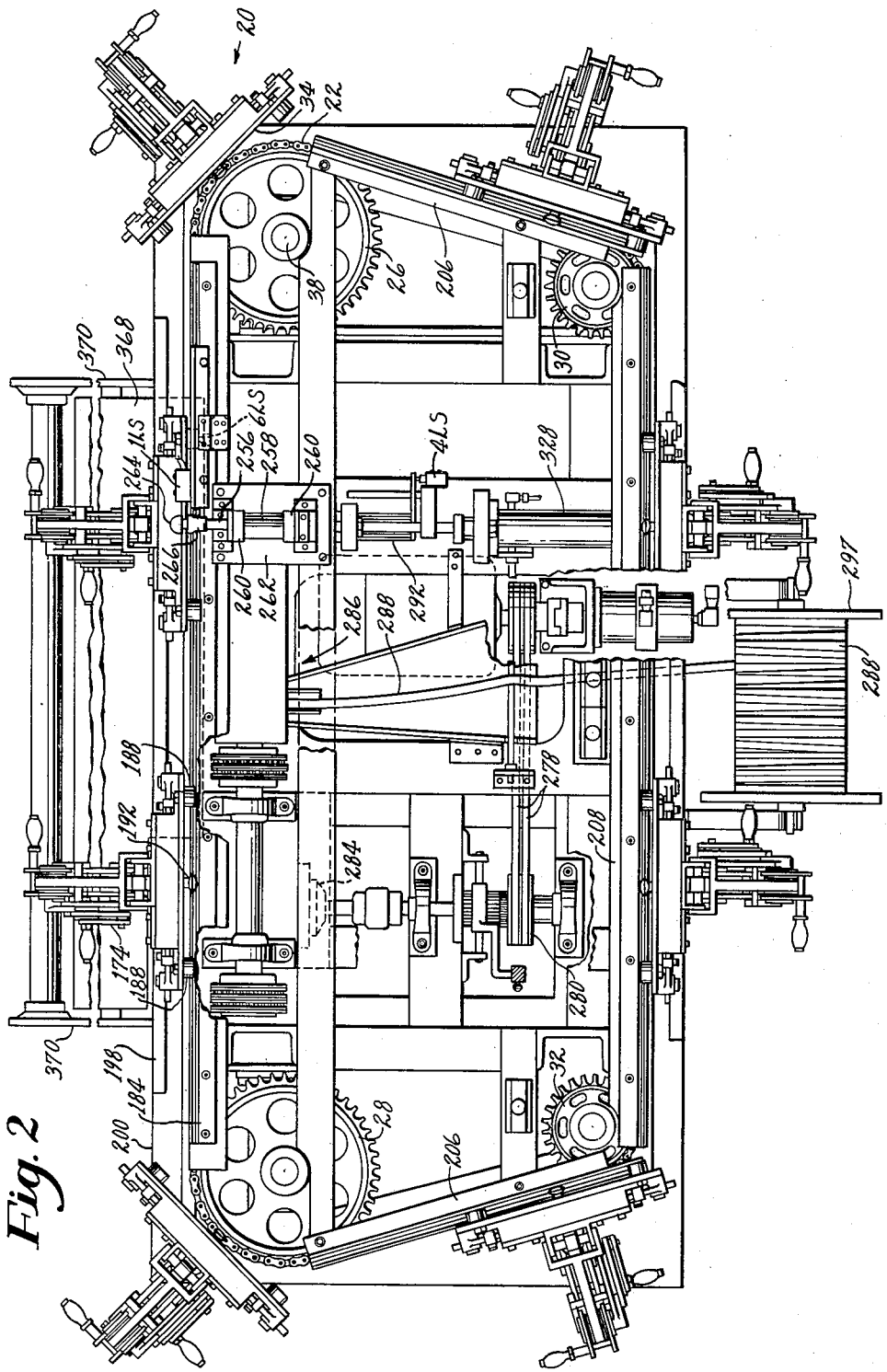

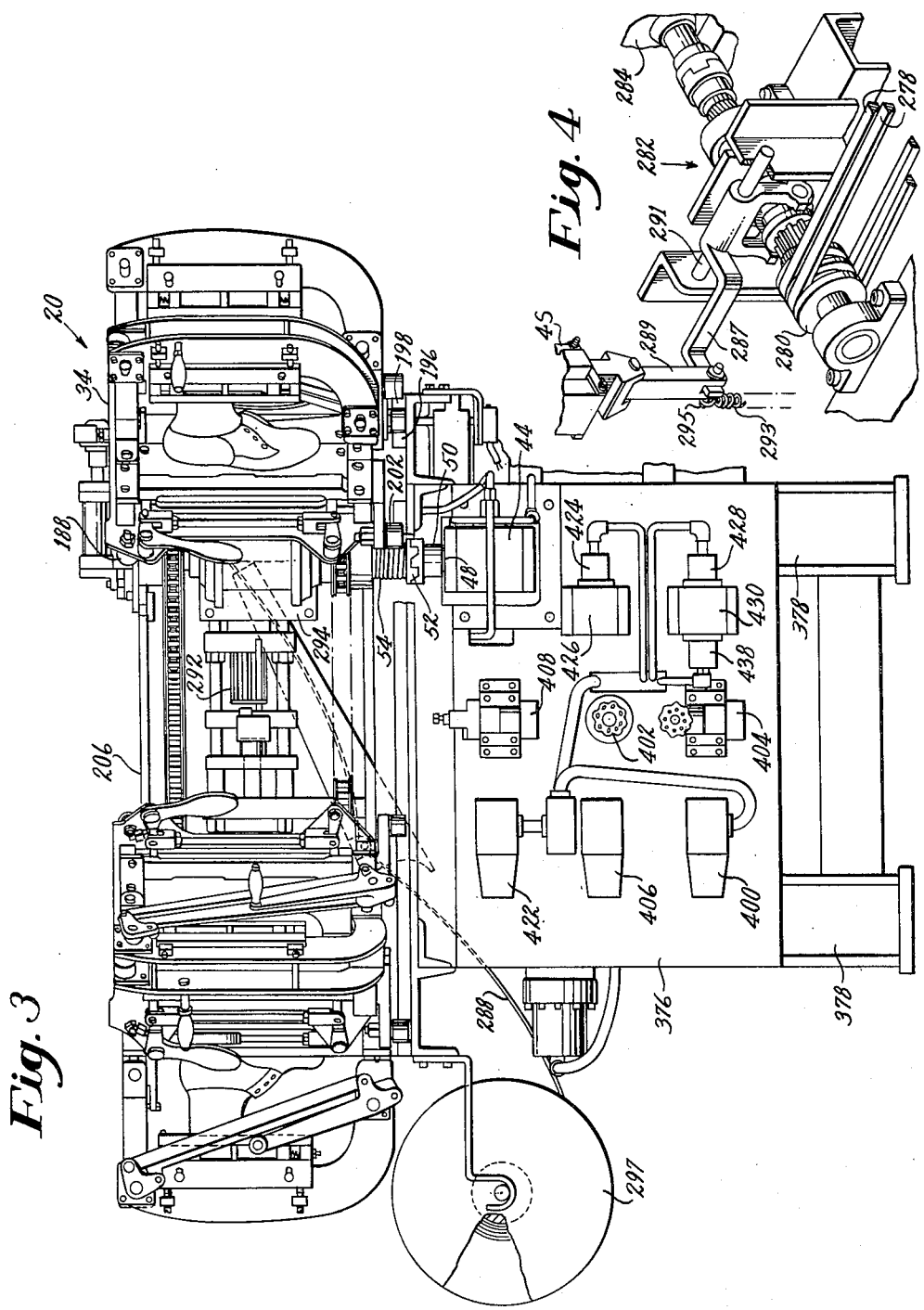

W. L. BAKER ET AL 3,006,032

PLASTIC INJECTION MOLDING MACHINES

Filed Aug. 5, 1958

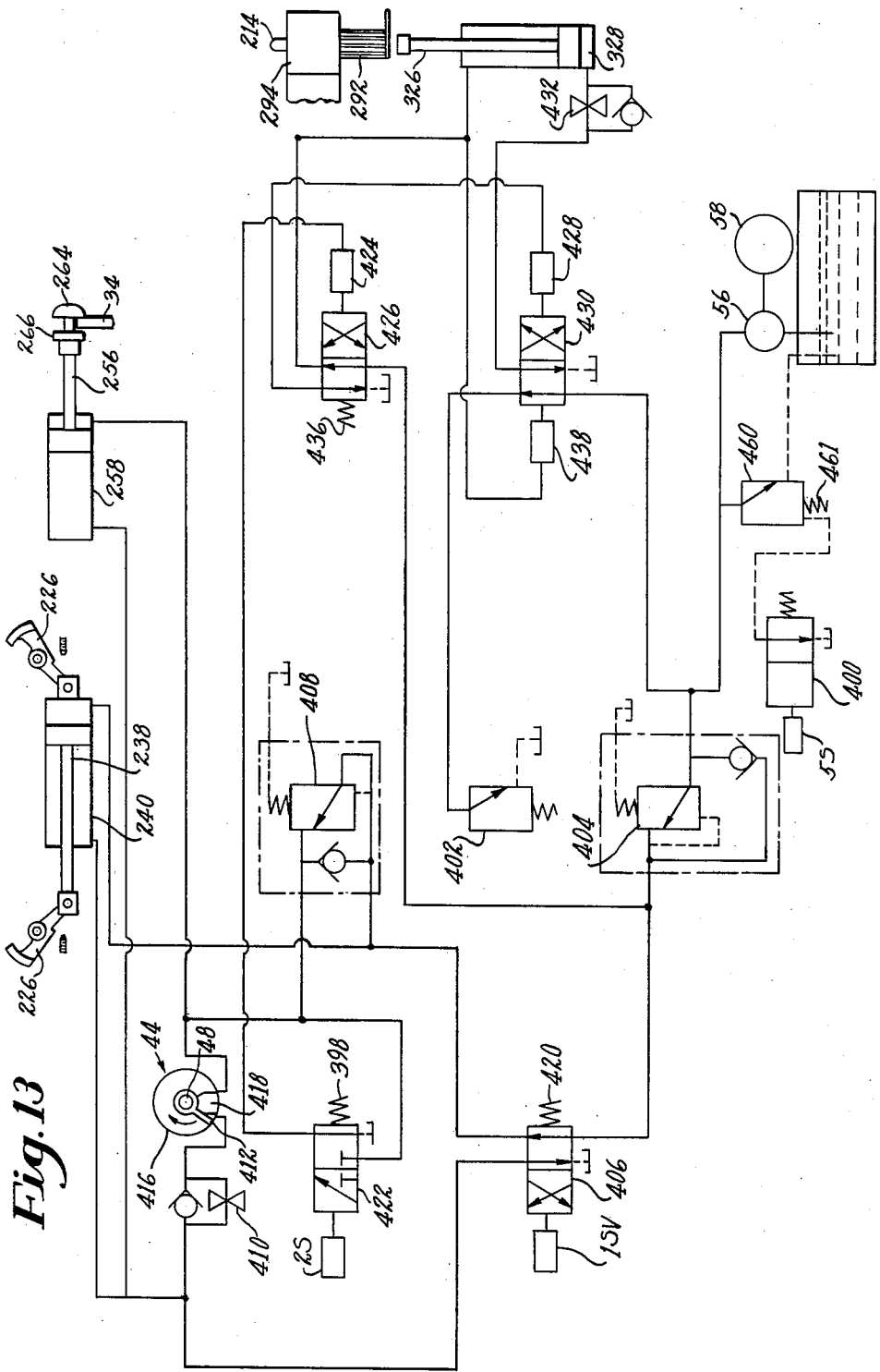

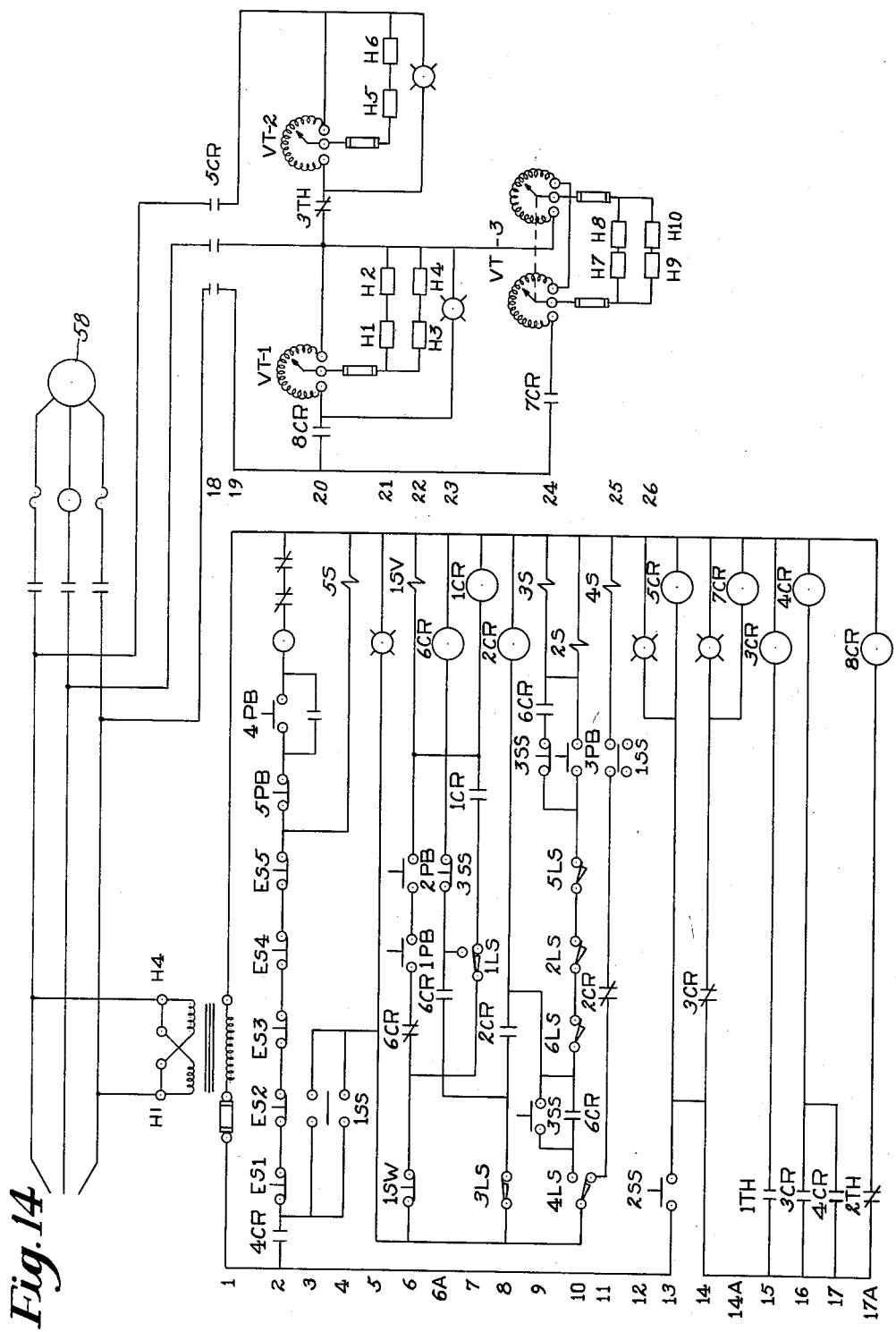

United States Patent Office 3,006,032
Patented Oct. 31, 1961

3,006,032
PLASTIC INJECTION MOLDING MACHINES
Willard L. Baker, Ipswich, Loring J. Berggren, Beverly, Donald B. McIlvin, Danvers, and Frank W. Spencer, Beverly, Mass., assignors to United Shoe Machinery Corporation, Flemington, N.J., a corporation of New Jersey
Filed Aug. 5, 1958, Ser. No. 753,228
6 Claims. (Cl. 18—30)

This invention relates to plastic injection molding machines and is herein illustrated in its application to machines for molding and attaching sole and heel units to the bottoms of lasted shoe uppers. A machine of this type is disclosed in United States Letters Patent No. 2,937,405, granted May 24, 1960 on an application filed in the names of Berggren, Dorosz and Leahy. In certain respects the machine of the present invention is generally similar to the machine disclosed in United States Letters Patent No. 2,589,323, granted March 18, 1952, on an application filed in the names of Ashley and Leahy. While the invention is herein illustrated in its application to machines for molding and attaching soles to the bottoms of lasted shoe uppers, it is to be understood that the invention is not limited in scope to machines of this type, but in certain aspects thereof, is applicable generally to plastic injection molding machines.

In general, it is an object of the present invention to provide a machine of the type above referred to suitable for commercial operation and operable at a production rate calculated to make it competitive with existing shoe bottoming procedures.

More specifically it is an object of the present invention to provide in machines of this type a conveyorized organization which permits the curing of a sole on a shoe bottom during a single cycle of the conveyor.

It is a still further object of the invention to provide in a conveyorized organization automatic controls permitting the operation of the machine by one workman with a minimum of manual control.

With the above objects in view the invention, in one aspect thereof, contemplates the provision in a plastic injection molding machine of the conveyorized type of a carrier for mounting any one of a plurality of mold assemblies and means in the mold charging station for positioning the mold assembly with relation to the plastic injection nozzle. The positioning means comprises a pair of positioning levers fulcrumed for opposite movement and arranged to position the mold assembly in the path of movement of the carrier, and means operating after the carrier has come to rest at the mold charging station to swing the carrier on a horizontal axis, thereby to bring the mold assembly into communication with the injection nozzle. Such swinging movement of the carrier initiates the operation of the mold charging means. In the illustrated organization the carrier is supported on a suitable rail in depending relation thereto and a pair of guide rolls at the lower extremity of the carrier engage guide rails which position the carrier with relation to the carrier locating levers in the mold charging station. Suitable limit switches are provided for arresting the advancement of the carrier at the injection station, for causing the operation of an actuator which swings the carrier to bring the mold assembly into communication with the injection nozzle, and for initiating the operation of a mold charging piston upon the completion of the operation of the actuator. The movement of the carrier is guided by a roll mounted in the upper extremity of the carrier and constructed and arranged to run in a groove in the rail on which the carrier is supported. At the injection station the groove is widened to permit the swinging movement of the carrier to and from a position in which the mold assembly is in communication with the nozzle.

These and other features of the invention will now be described with reference to the accompanying drawings and pointed out in the appended claims.

In the drawings,

FIG. 1 is a perspective view illustrating a machine embodying the features of the present invention;

FIG. 2 is a plan view of the machine illustrated in FIG. 1, certain parts being broken away to disclose underlying parts;

FIG. 3 is a left side elevation of the machine, certain parts being broken away to disclose the interior structure;

FIG. 4 is an angular view illustrating a clutch mechanism and related parts;

FIG. 13 is a hydraulic flow chart; and

FIG. 14 is a diagram of the electrical organization.

Figure 5:
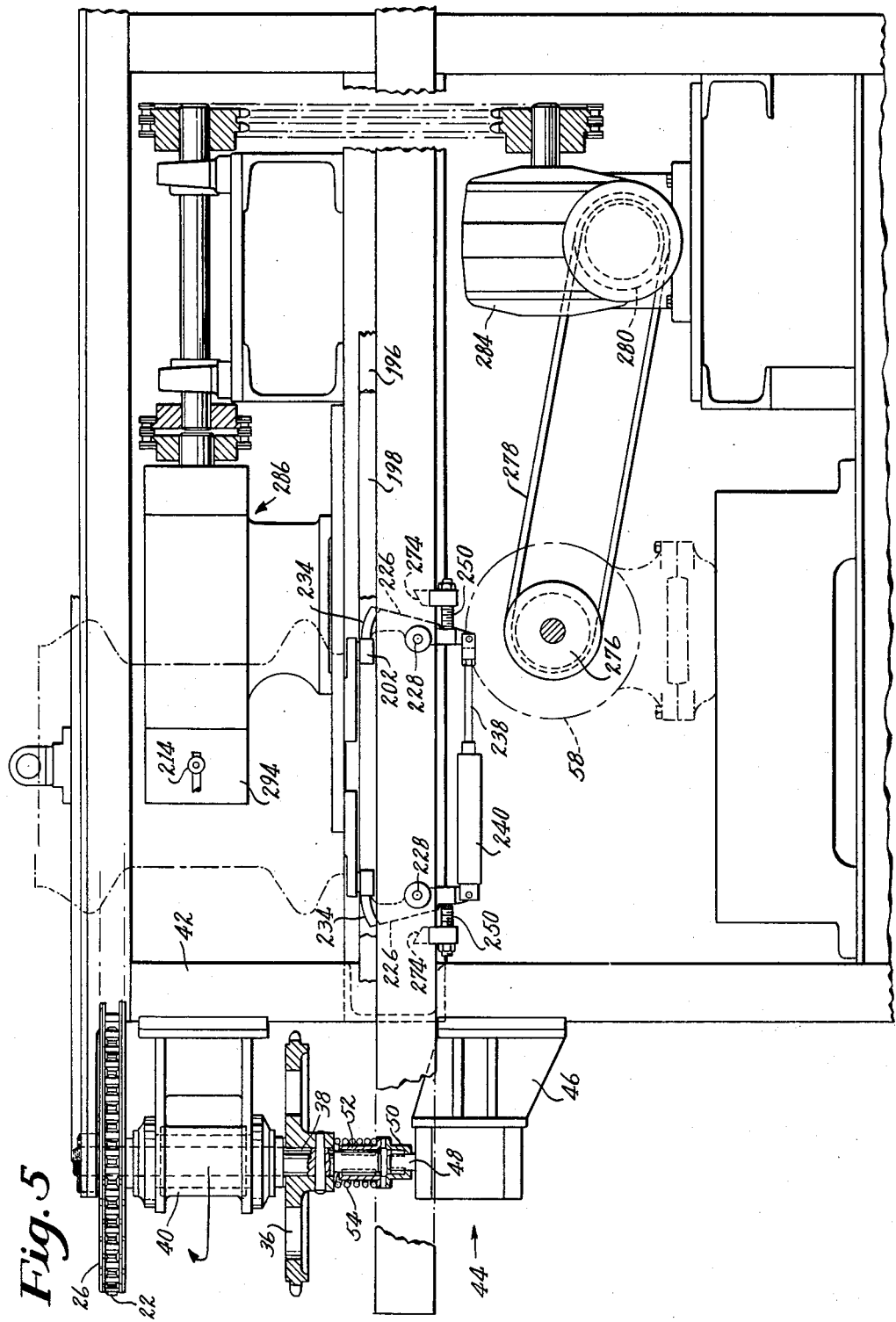
FIG. 5 is a front elevation illustrating particularly the power plant.

The invention is illustrated in the drawings as embodied in a machine having a plastic injecting organization and a plurality of ambulatory assemblies each comprising mold elements and work supporting means generally similar in their construction and operation to the injecting organization, mold elements and work supporting means illustrated in a machine disclosed in the Berggren et al. Patent No. 2,937,405, hereinbefore referred to.

The illustrated machine is provided with an endless conveyor mechanism on which eight ambulatory assemblies are mounted at positions uniformly spaced along the length of the conveyor. The conveyor mechanism advances the ambulatory assemblies successively from a loading station in which a lasted shoe is mounted in the ambulatory assembly to an injection station in which the mold cavity is charged with plastic thereby to form a sole on the shoe bottom. From the injection station the conveyor mechanism successively advances the ambulatory assemblies in a plurality of steps along the path of movement of the conveyor to the loading station. Sufficient time elapses during the movement of each ambulatory assembly from the injection station to the loading station for the curing or solidification of the molded sole on the shoe bottom to a degree sufficient to permit the opening of the mold and the removal of the shoe from the work support at the loading station.

The conveyor is operated by a hydraulic motor which is controlled by a valve operated by a solenoid. In order to prevent the operation of the conveyor until the plastic injecting organization has been heated to a degree sufficient to insure the reduction of a body of plastic therein from a solid to a molten or fluid state, thermostats controlling the temperature of parts of the plastic injecting organization are interposed into the electrical circuit to the solenoid above referred to so that the circuit can not be closed until the thermostats have been satisfied. After the operating temperature has been reached, an electric switch is manually operated to cause the extrusion of fluid plastic into a supply cylinder from which it is subsequently expelled through a sprue nozzle to charge the mold cavity. After the supply cylinder has been filled, two electric push button switches are manually operated to energize the solenoid above referred to which operates a valve to open a hydraulic pressure line to the fluid motor which actuates the conveyor. Thereupon, the conveyor advances an ambulatory assembly from the loading station to the injection station. Just before the ambulatory assembly reaches the injection station it engages and operates a limit switch to open the circuit to the solenoid above referred to, causing the conveyor to stop. The operation of the limit switch also serves to energize a solenoid to open a fluid pressure line to a hydraulic piston which actuates mechanism for so positioning the ambulatory assembly that the sprue nozzle registers accurately with a plastic injection port in one of the mold elements. The operation of the mechanism for so registering the ambulatory assembly closes a circuit to a third solenoid which operates a valve to open a fluid pressure line to a hydraulic piston which moves the ambulatory assembly relatively to the sprue nozzle to cause the nozzle to be seated in the mouth of the plastic injection port. Such motion of the ambulatory assembly operates a microswitch to energize a solenoid which opens a valve in the sprue nozzle. The operation of said microswitch also causes the operation of a hydraulic piston to expel fluid plastic from the supply cylinder through the sprue nozzle into the mold cavity. After the mold cavity has been filled the pressure of the plastic injecting piston causes pressure to build up within the mold cavity sufficiently to operate a spring biased plunger mounted in a bore extending through one of the mold elements. The movement of the plunger operates a microswitch which causes the operation of the plastic injecting piston to terminate. The operation of said microswitch also serves to close the valve in the sprue nozzle. Thereupon the extruder operates to fill the supply cylinder and to effect the retraction of the plastic injecting piston. After the supply cylinder has been filled the retracting movement of the plastic injecting piston operates a limit switch which causes the termination of the operation of the extruding means. The operation of the microswitch, above referred to, by the plunger in the mold assembly also serves to cause the movement of the ambulatory assembly away from the sprue nozzle to permit further advancement of the assembly when the conveyor is recycled.

Figure 10:
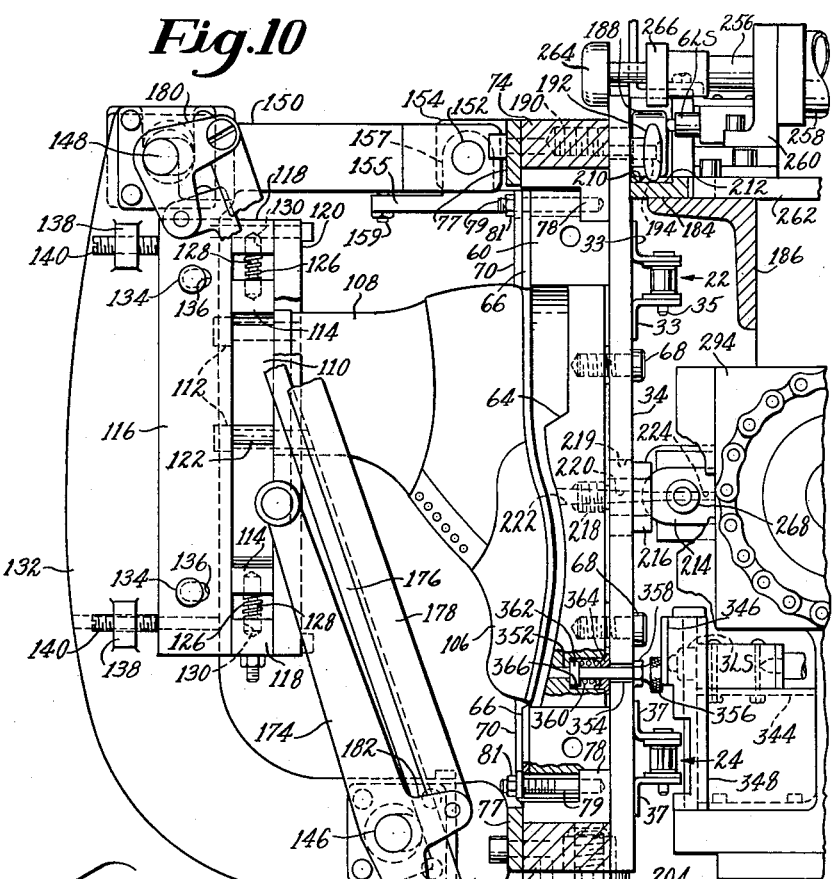
FIG. 10 is a side elevation illustrating particularly the ambulatory assembly in position for the injection of fluid plastic into the mold cavity.

Referring to FIG. 1, the illustrated machine is equipped with eight ambulatory assemblies one of which is identified by the numeral 20, said assemblies being uniformly spaced lengthwise of an endless conveyor comprising an upper chain 22 and a lower chain 24. Referring to FIG. 2, the upper chain is mounted on two large sprockets 26 and 28 in the front portion of the machine and two small sprockets 30 and 32 in the rear portion of the machine, the axes of the rear sprockets 30 and 32 being somewhat closer together than the axes of the front sprockets 26 and 28 so that the lengths of the chain 22 extending rearwardly from the front sprockets are arranged in convergent relation to each other. The lower chain 24 and the four sprockets on which it is mounted are identical in construction and arrangement to the upper chain 22 and its sprockets. Referring to FIG. 10, each ambulatory assembly is provided with two brackets 33 between which is mounted the chain 22, the illustrated brackets being secured to a vertically disposed plate 34 forming the base of the ambulatory assembly. Two link pins 35 of the chain 22 extend through apertures in the brackets and through the chain elements. Similar brackets 37 are secured to the lower portion of the plate 34 for the attachment of the chain 24. The mounting of the four sprocket assemblies is substantially identical and will be understood from the illustrated mounting of the left front assembly in FIG. 5. The upper sprocket 26 and a lower sprocket 36 identical thereto are fixed to a shaft 38 journaled in suitable bearings in a bracket 40 secured to the upper portion of the left front leg 42 of the machine frame. For driving the conveyor chains in the direction of the arrow in FIG. 5 a hydraulic motor 44 hereinafter described is positioned beneath the shaft 38 and mounted on a bracket 46 secured to the leg 42. The hydraulic motor 44 has a power output shaft 48 extending vertically upwardly therefrom, said shaft having fixed to its upper end portion a crown type ratchet wheel 50. The ratchet wheel 50 meshes with a ratchet wheel 52 of identical construction splined on the lower portion of the sprocket shaft 38 and movable vertically on the sprocket shaft into and out of intermeshing relation to the ratchet 50. The ratchet wheel 52 is urged downwardly into intermeshing relation with the ratchet wheel 50 by a spring 54 surrounding the hub of the ratchet wheel 52 and confined between the hub of the sprocket wheel 36 and the outwardly flanged head of the ratchet wheel 52. The hydraulic motor 44 is operated by pressure fluid delivered by a pump 56 (FIG. 8) actuated by an electric motor 58.

Figure 6:
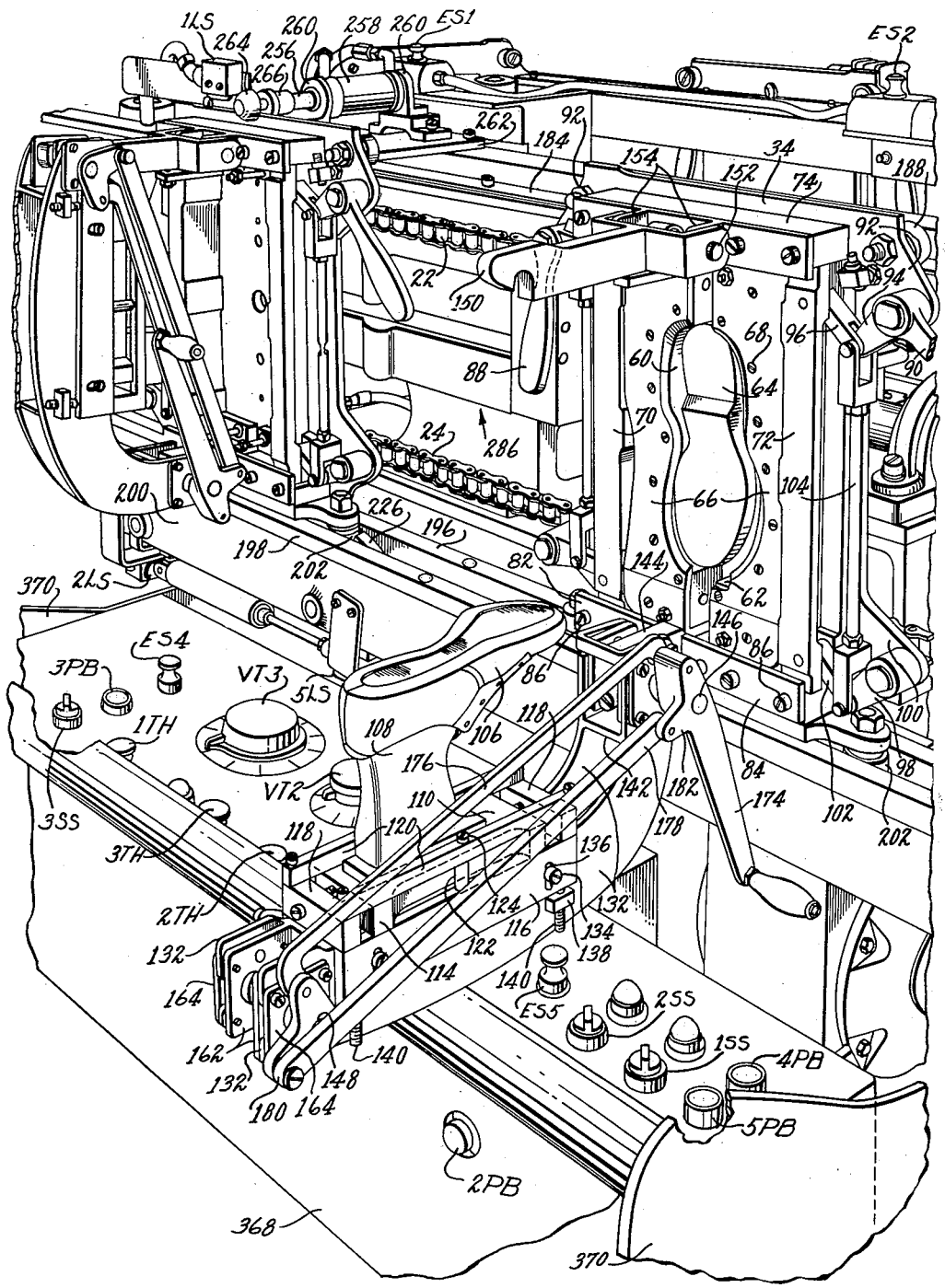
FIG. 6 is a perspective view looking at the front and the left side portion of the machine.

Referring to FIG. 6, the illustrated ambulatory assembly comprises means for supporting a lasted shoe, mold elements for molding an outsole on the shoe bottom, and means for clamping the shoe against the mold elements. The illustrated mold organization comprises side mold members 60 and 62 which, in their closed position, define the periphery of an outsole and a bottom mold member 64 complemental in shape to the bottom or tread surface of a sole. Secured to the side mold members are plates 66 which define the periphery of the shoe bottom at its juncture with the sole. Referring to FIG. 10, the bottom mold member 64 is secured to the plate 34 by headed screws 68 which are readily removable to permit the substitution of another bottom mold member of a different size or style. Referring to FIG. 1, the side mold members are mounted in suitble holders which are movable toward and from each other in a mold carrier, the mold holders comprising side walls 70 and end walls 72 extending inwardly at right angles to the side walls. Referring to FIG. 10, the end walls are provided with flanges 78 to which the side mold members are removably attached by studs 79 mounted in and projecting from the flange 78 through suitable bores in the side mold members, clamping nuts 81 being provided on the studs for clamping the side mold members against the flanges 78. The mold holders slide between horizontal rails 74 and 76 positioned respectively above and below the mold holders. The holders are held against movement away from the plate 34 by retaining plates 77 secured to the rails 74 and 76, respectively. The side mold members are closed against the bottom mold member 64 by the operation of two hand levers 88 and 90 (FIG. 6) pivotally mounted on ears 92 projecting outwardly from the upper portion of the plate 34. Formed integrally with each hand lever is an arm 94 forming one element of a toggle the other element of which is a link 96 pivoted at one end to the arm 94 and at the opposite end within a channel formed in the movable side wall of the mold box. The lower portion of the side wall is actuated by toggle mechanism comprising a link 98 pivotally mounted on an ear 100 projecting outwardly from the plate 34 and pivoted to a link 102 which, like the link 96, is pivotally mounted in the channel formed in the side wall member. In order to provide for parallel motion of the toggle elements by the operation of the hand lever 88, the toggles are interconnected by a link 104. Referring to FIG. 1, when the toggle elements are in their straightened or locked position as shown in the ambulatory assembly located at the injection station, the side mold members are in contiguous relation to each other and to the bottom mold member 64 thus forming the base and the wall of the mold cavity.

Figure 11:
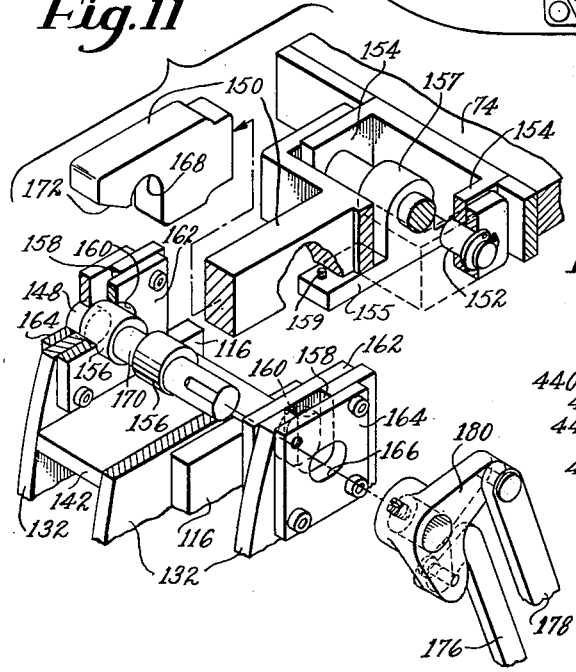
FIG. 11 is an exploded angular view illustrating parts of the mechanism for clamping a shoe against the mold elements.

Referring to FIG. 10, a lasted shoe 106 is mounted on a shoe form 108 having a shank portion which terminates in a plane surface which is substantially parallel to the plane of the heel seat portion of a shoe mounted on the form. The form 108 is removably attached to a plate 110 by two headed screws 112. Referring to FIG. 6, the plate 110 is provided at opposite ends with lateral extensions one of which is identified by the numeral 114. The four extensions provide means for supporting the plate 110 on the upper edge faces of two parallel plates 116 of an assembly in which the plate is supported. The two plates 116 are connected together at opposite ends thereof by crossbars 118. Secured to the tops of the crossbars at opposite ends thereof are two parallel rails 120 which bear against the upper surfaces of the extensions 114 and hold the plate 110 against upward movement away from the plates 116. Lateral movement of the plate 110 is restricted by two tubular members one of which is illustrated in FIG. 6 and identified by the numeral 122, each tubular member being positioned between the rail 120 and the plate 116 and secured by a headed screw 124 extending through a bore in the rail and through the length of the tubular member and into a tapped hole in the plate 116. Referring to FIG. 10, endwise movement of the plate 110 is restricted by two springs 126 mounted on pins 128 projecting from the plate 110, the free end portions of the springs being seated in sockets 130 formed in the crossbars 118. The two plates 116 are secured to the outer surfaces of two parallel arms 132 of a carrier mechanism hereinafter described. In order to provide for the adjustment of the shoe form 108 heightwise of the shoe 106 so that the shoe will seat properly against the mold elements the two plates 116 are secured to the arms 132 by headed clamping screws 134 extending through vertical slots 136 formed in the plates 116. In order to facilitate the adjustment of the plates 116 the arms 132 are provided with outwardly projecting ears 138 having vertically tapped holes which receive screws 140 which bear against the bottom edge faces of the plates 116, respectively. It will be seen that the illustrated organization affords adjustments of the shoe form 108 relatively to the arms 132 endwise, widthwise and heightwise of the shoe 106 and angularly on an axis extending heightwise of the shoe, thus permitting an accurate registration of the shoe 106 with relation to the beveled edge faces of the two plates 66 secured to the side mold members. At their opposite ends the parallel arms are connected together by crossheads 142 (FIG. 6). Referring to FIG. 10, the lower portions of the arms 132 form a right angle with the greater portions thereof and extend rearwardly for pivotal mounting on an arm 144 projecting forwardly from the bottom wall 76 of the mold box. A crosspin 146 is provided for pivotally connecting the carrier arms 132 to the arm 144 and a similar cross pin 148 is mounted in the opposite end portions of the carrier arms to receive a latch hook 150, a bifurcated rear end portion of which is pivotally mounted on a crosspin 152 mounted in two ears 154 (FIG. 11) projecting forwardly from the upper wall 74 of the mold box. The hook 150 is supported against downward movement from its position illustrated in FIGS. 10 and 11 by an arm 155 pivotally mounted on the cross pin 152, a suitable boss 157 being formed on the arm and bored to receive the cross pin. As shown in FIG. 10, the angular position of the latch hook 150 is adjustable by vertically adjusting a supporting screw 159 mounted in the forward portion of the arm 155. The two cross pins 146 and 148 mounted in the carrier arms 132 are of identical construction. Referring to FIG. 11 illustrating the cross pin 148 at the upper end of the carrier assembly, said cross pin is characterized by two enlarged cylindrical portions 156 eccentric to the end portions and the central portion. The enlarged portions 156 are positioned within open ended slots 158 in the arms 132 and closed slots 160 formed in plates 162 secured to the inner surfaces of the arms 132. The cross pin is held against endwise movement by two retainer plates 164 secured to the outer surfaces of the arms 132, the retainer plates being provided with horizontal slots 166 in order to provide for the relative movement of the end portions of the cross pin and the enlarged portions 156. The hook 150 is provided with an arcuate based notch 168 for engagement with the central portion 170 of the cross pin, and the forward extremity of the hook is beveled at 172 to permit upward displacement thereof by the cross pin 148 as the shoe supporting assembly moves upwardly into its latched position shown in FIG. 10. For rotating the cross pin 146 a hand lever 174 is secured thereto, and for rotating the cross pin 148 in unison with the cross pin 146 two parallel motion links 176 and 178 are provided between the hand lever and a right angular lever 180 secured to the cross pin 148. The link 176 is connected at one end to an extension of the hand lever 174 and at the other end to the upward extremity of the lever 180, as seen in FIG. 6. The link 178 is connected at one end to an arm 182 projecting radially from the hub portion of the hand lever at right angles thereto and at the other end to the extremity of the forwardly extending arm of the lever 180. Thus, it will be seen that the operation of the hand lever 174 to rotate the cross pin 146 causes the parallel motion links 176 and 178 to effect a like rotation of the cross pin 148. Inasmuch as the construction and the mounting of the cross pin 146 corresponds to the construction and the mounting of the cross pin 148 their simultaneous operation causes the carrier assembly together with the work supporting organization and the lasted shoe on the form 108 to advance bodily without any angular movement thereby to clamp the shoe bottom against the beveled edge faces of the plates 66 which, at this stage in the operation of the machine, are in their closed position.

During the movement of the ambulatory assemblies along the straight run in the front of the machine each assembly is supported by the engagement of two rolls with a flat rail 184 (FIG. 10) secured to a horizontal angle iron 186 forming one element of the superstructure of the machine frame. The illustrated ambulatory assembly is provided with two supporting rolls only one of which is illustrated in FIG. 10 and identified by the numeral 188. The illustrated roll is mounted to rotate on a headed screw 190 mounted in the upper wall 74 of the mold box. For determining the path of movement of the roll 188 on the rail 184 a guide roll 192 is constructed and arranged to run in a suitable groove 210 provided in the rail 184. As shown in FIG. 10 the guide roll is offset from the groove for a reason hereinafter given. The illustrated guide roll is mounted to rotate on a headed screw 194 mounted in the upper wall 74 of the mold box. The lower portion of the ambulatory assembly is held against forward and rearward movement by two parallel rails 196 and 198 mounted on an inverted horizontal channel member 200 secured to the machine frame. Two guide rolls carried by and extending downwardly from the ambulatory assembly travel between the two rails 196 and 198. The rearmost only of the two rolls is shown in FIG. 10 and identified by the numeral 202, said roll being mounted on a headed screw 204 fixed in the bottom wall 76 of the mold box. As shown in FIG. 1, the rear rail 196 extends almost the full length of the channel member 200 but the forward rail 198 is made substantially shorter in order to provide clearance for the movement of the leading guide roll as each ambulatory assembly is advanced in an arcuate path determined by the two sprockets at the right end portion of the machine. Similarly, at the left end portion of the machine the shortening of the forward rail 198 provides clearance for the movement of the trailing guide roll 202. Referring to FIG. 2, each ambulatory assembly, during its short runs at the opposite ends of the machine, is supported by rails 206 similar to the rail 184 and a like rail 208 at the rear of the machine supports each ambulatory assembly during its movement between the small sprocket wheels 30 and 32. Cooperating with the rails 206 and 208 are bottom guide rails (not shown) similar in their construction and arrangement to the rails 196 and 198 illustrated in FIG. 10. As each ambulatory assembly comes into the injection station the guide roll 192 travels out of the groove 210 and into a wide groove 212 (FIG. 9) which permits rearward movement of the ambulatory asssembly to the extent required to effect mating engagement between a sprue nozzle 214 and a recess in a head 216 at the rear portion of a plug 218. As shown in FIG. 10, the plug 218 is secured in a tapped counterbore in the bottom mold member 64 and the base plate 34 of the ambulatory assembly has formed therein a hole 219 coaxial with and greater in diameter than the head 216 in order to facilitate the removal from the mold blocks of the bottom mold member 64 with the plug 218 attached thereto. The plug 218 has an axial bore 220 which tapers toward and through the head 216 and said bore communicates at its large end with a similarly tapered bore 222 in the bottom mold member 64 and at its small end with a bore 224 in the sprue nozzle 214. The provision of the tapered bores facilitates the withdrawal of the sprue which forms in said bores during the mold charging operation.

Figure 9:
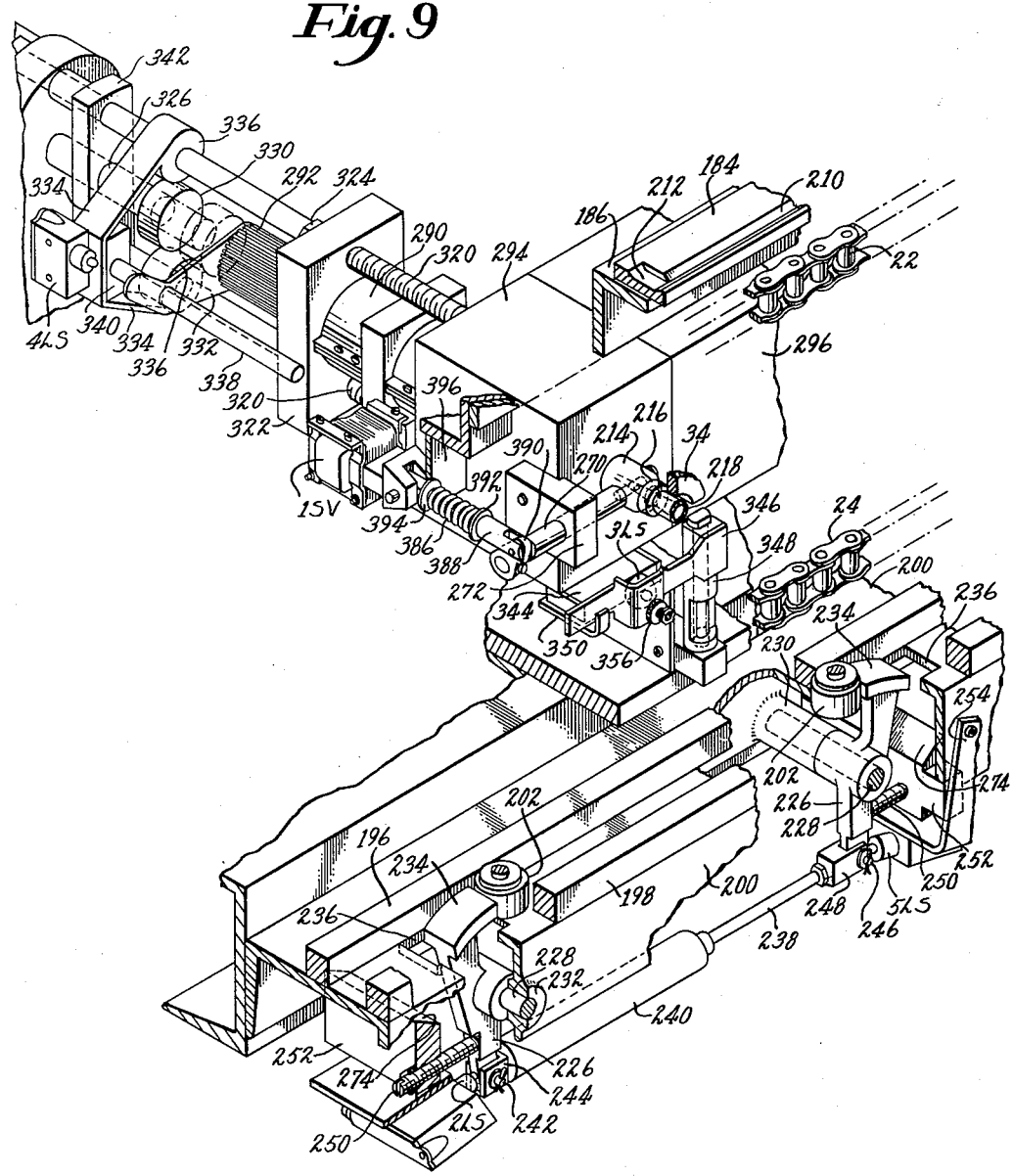
FIG. 9 is an angular view illustrating parts of the plastic injection organization and means for positioning the ambulatory assembly relatively to the sprue nozzle.

It will be understood that the charging of the mold cavity with fluid plastic expelled from the sprue nozzle presupposes the accurate location of the ambulatory assembly at the injection station to cause the head 216 to register with the nozzle. Such location of the ambulatory assembly can not be assured by merely terminating the operation of the conveyor as the ambulatory assembly comes to the injection station since the inertia of the moving parts would cause an increment of movement of the ambulatory assembly after the application of power to the conveyor had been interrupted, and the extent of such increment of movement would vary with variations in the weight of the mold elements, the shoe forms and the shoes mounted thereon. Accordingly, the illustrated machine is provided with means for accurately positioning the ambulatory assembly with relation to the sprue nozzle after the operation of the conveyor has been interrupted. Referring to FIG. 9, the illustrated locating means comprises a pair of levers 226 mounted on cross pins 228 the rear portions of which are mounted in cylindrical bosses 230 projecting forwardly from the rear wall of the channel member 200 and the forward portion of which is mounted in an enlarged section 232 of the forward wall of the channel member. Each lever 226 is provided with a head 234 having a rectangular end face which bears against one of the guide rolls 202 at the lower portion of the ambulatory assembly. To provide clearance for the operation of each lever 226 a rectangular opening 236 of suitable dimensions is formed in the upper wall of the channel member 200. For operating the levers 226 there is provided a hydraulic piston the stem of which is shown in FIG. 9 and identified by the numeral 238. The piston operates in a cylinder 240 which is pivotally connected to the reduced lower end portion of the lever 226 at the left in FIG. 9 by a cross pin 242 mounted in a yoke 244 secured to and projecting from the end wall of the cylinder 240. Similarly, the stem 238 is pivotally connected to the lever 226 at the right in FIG. 9 by a cross pin 246 extending through a yoke 248 fixed to the stem 238 and through the reduced lower end portion of the lever 226. The operation of the piston moves the heads of the levers 226 toward each other and into engagement with the rolls 202, the advancement of the levers terminating upon the engagement of their downwardly extending portions with the ends of two screws 250, respectively, fixed in crossheads 252 mounted on brackets 254 secured to the channel member 200.

For swinging the ambulatory assembly rearwardly in order to effect mating engagement between the sprue nozzle 214 and the recessed head 216 of the plug 218 the illustrated machine is provided with a hydraulic piston the stem of which is illustrated in FIGS. 6 and 10 and identified by the numeral 256. The piston is mounted in a cylinder 258 secured to brackets 260 mounted on a fixed plate 262. The advancement of each ambulatory assembly into the injection station brings the upper margin of the base plate 34 into registration with a head 264 fixed to the stem 256. Rearward movement of the stem causes the head 264 to engage the plate 34 and to swing the ambulatory assembly rearwardly thereby to effect mating engagement between the sprue nozzle 214 and the head 216. Forward movement of the stem 256 causes a collar 266 fixed to the stem to engage the upper margin of the plate 34 and to swing the ambulatory assembly forwardly thereby to disengage the head 216 from the sprue nozzle and to return guide roll 192 to its position of alinement with the groove 210 in the rail 184. Prior to the disengagement of the head 216 from the sprue nozzle the nozzle is closed by the rotation of a gate valve 268 (FIG. 7) mounted therein. Referring to FIG. 9, the valve is operated by the rotation of a shaft 270 projecting therefrom and journaled in a suitable bearing in a fixed block 272. The retraction of the levers 226 by the reverse action of the piston 238 is limited by the engagement of the levers with beveled surfaces 274 of the crossheads 252. It will be understood that the provision of such top surfaces insures a sufficient retraction of both levers to bring the heads 234 into a position affording clearance for the passage of the rolls 202 of the ambulatory assembly during the next cycle of operation of the machine.

Figure 8:
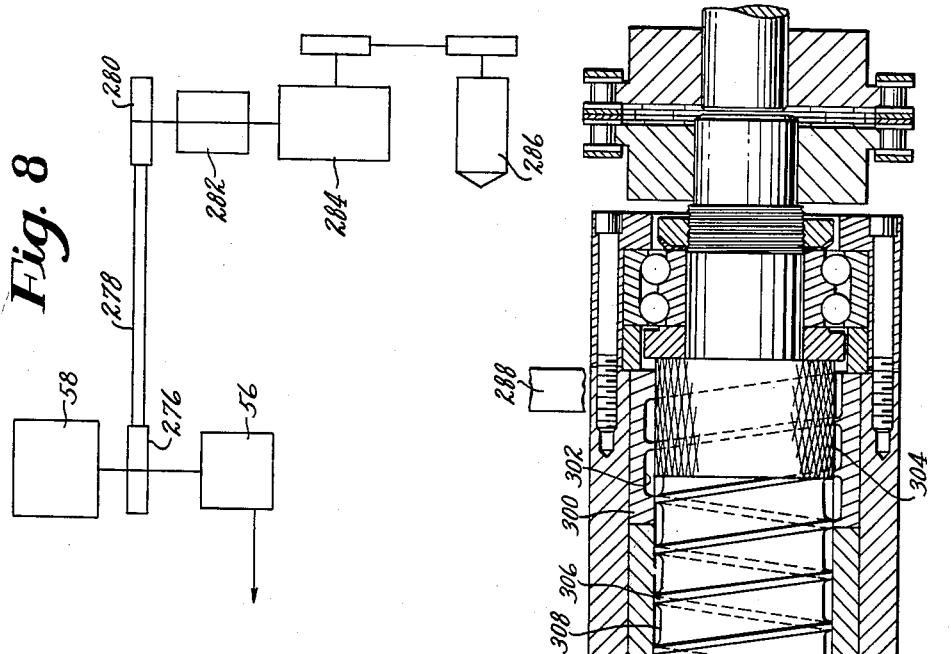
FIG. 8 is a diagrammatic view of the power assembly for operating the plastic extruding mechanism.
Figure 7:
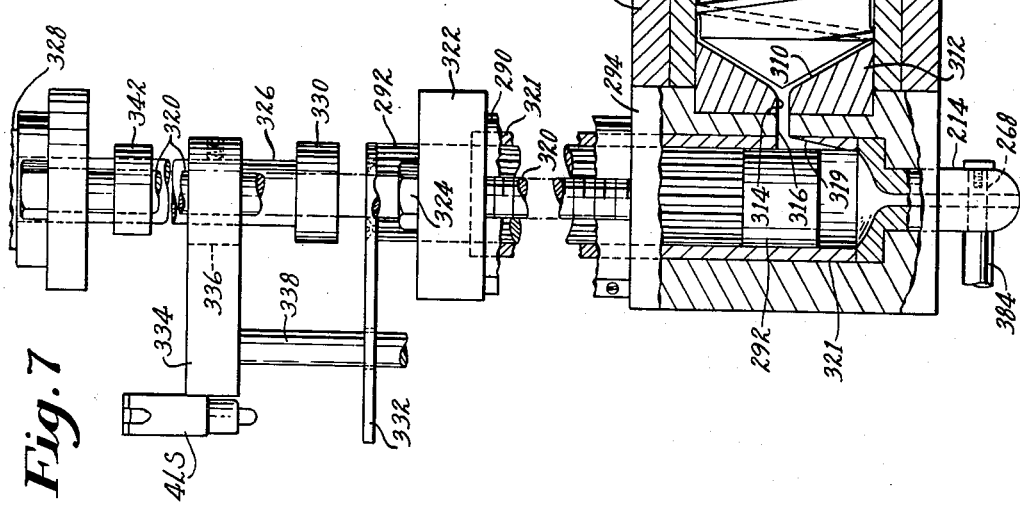
FIG. 7 is an enlarged plan view of the plastic extruding and injecting means partly in section on the axis of the plastic extruding auger, parts of the injecting assembly being broken away in order to permit a disclosure of all of the devices comprising the plastic injecting organization.

For charging the mold cavity with fluid plastic the illustrated machine has incorporated therein a plastic injecting organization generally similar in its construction and operation to the plastic injecting organization incorporated in the machine illustrated in United States Letters Patent No. 2,589,323, above-mentioned. Referring to FIG. 8, illustrating diagrammatically certain elements of the plastic injection organization, the motor 58 actuates a pulley 276 which is connected by a pair of transmission belts 278 to a similar pulley 280 which actuates the driving element of a clutch mechanism indicated diagrammatically at 282. The driven element of the clutch mechanism operates a speed reduction unit 284 which operates an extruder 286 through a sprocket and chain transmission illustrated in FIG. 5. Referring to FIG. 4, there is provided for the actuation of the clutch mechanism a solenoid 48 which operates a bell crank lever 287 through a link 289, the bell crank lever being pivotally mounted on a cross pin 291 mounted in the machine frame. The operation of the solenoid engages the clutch elements and separates brake elements (not shown). For disengaging the clutch elements and engaging the brake elements a spring 293 is mounted on a pin 295 connecting the link 289 to the bell crank lever 287 and extends downwardly therefrom to a fixed anchorage (not shown). Referring to FIG. 7, the extruder, which is of the auger type, receives plastic in the form of a continuous tape 288 from a reel 297 (FIG. 3) and transmits the plastic in fluid condition to a cylinder 290 in which operates a piston 292 whereby fluid plastic in the cylinder is expelled through the sprue nozzle 214 and into the mold cavity. Suitable means, not illustrated in the drawings, is provided for imparting radiant heat to the extruding assembly, to the cylinder 290 and to a block 294 forming a union between the cylinder and the extruding assembly. The illustrated extruding assembly comprises a casing 296 in which is mounted a sleeve 298 of wear resisting material and a shorter sleeve 300 having a spiral groove 302 formed in its inner surface. The groove 302 has substantially the same dimensions as the tape 288 and the right end portion of the groove as seen in FIG. 7 communicates with an opening extending through the sleeve 300 and the casing 296 in tangential relation to the extruder for the reception of the tape 288. The extruder is characterized by a cylindrical head 304 which is knurled for gripping engagement with the tape 288. The screw portion of the auger extending from the head 304 is characterized by a single thread 306 the flights of which are spaced apart from each other to an extent substantially equivalent to the width of the tape 288. The auger is further characterized by a spiral groove 308 between the flights of the thread which is reduced in depth progressively from the receiving end to the discharging end of the auger, the depth at the discharging end being approximately one half the depth at the receiving end. The head 304 of the extruder is made shorter than the sleeve 300 to an extent sufficient to permit the transmission of the tape 288 from the delivery end of the groove 302 into the receiving end of the groove 308. At this point the tape has been sufficiently softened by the heat in the extruder assembly so that it offers no resistance to any deformation to which it may be subjected by the thread 306. During the passage of the plastic from the receiving end to the discharging end of the auger the plastic receives a vigorous milling action which causes a substantial rise in its temperature and thus accelerates the reduction of the plastic from a solid to a fluid state. At the discharging end of the auger the fluid plastic passes into a shallow conical recess 310 formed in a cylindrical block 312 the right end portion of which is mounted in the left end portion of the sleeve 298 while the left end portion of the block projecting from the sleeve is seated in a counterbore formed in the block 294. From the recess 310 the fluid plastic passes through an axial port 314 in the block 312 and an alined port 316 in the block 294 to a downwardly extending channel 319 formed in a sleeve 321 in which operates the piston 292. As shown in FIG. 7, the piston is grooved or fluted longitudinally from its forward end portion to its rearward extremity in order to reduce its area of physical contact with the sleeve 321. The grooves in the piston terminate short of its pressure end and the end walls of the grooves operate during the retraction of the piston to scrape from the sleeve 321 any residue of plastic left thereon after the completion of the piston stroke. The rear end portion of the sleeve 321 is mounted in a suitable counterbore in a block 322 and the outer casing of the cylinder 290 is arranged in abutting relation to the block 322 and the block 294. The block 322 is clamped against the rear end of the casing by clamping nuts 324 mounted on two tie rods 320 anchored in the block 294 and extending through suitable bores in the block 322. The forward portion of the sleeve 321 is mounted in a suitable counterbore in the block 294 and its forward end face abuts the outwardly flanged base portion of the sprue nozzle 214 which is seated against the base of the counterbore. It will be understood that the plate 322 is provided with a suitable opening for the passage of the piston 292 therethrough. For advancing the piston to cause the expulsion of fluid plastic through the sprue nozzle 214 a hydraulic piston 326 is mounted in a cylinder 328 and so arranged that a head 330 at the forward end of the piston rod bears against a plate 332 secured to the rear end face of the piston 292. The tie rods 320 are extended rearwardly from the plate 322 to provide for the mounting of a bracket on which is mounted a microswitch 4LS. The illustrated bracket comprises two arms 334 (FIG. 9) which converge outwardly to a vertical central section on which the microswitch is mounted, said arms terminating in cylindrical sections 336 which are bored to receive the extensions of the tie rods. The microswitch is automatically operated by the piston 292 as it comes to the limit of its retracting movement. To that end the plate 332 on the rear end face of the piston 292 is extended outwardly to a guide rod 338 and further extended from the guide rod outwardly with an upward inclination to bring its end portion into horizontal alinement with the microswitch. The illustrated guide rod 338 is fixed in a block 340 secured to the inner surface of the vertical section of the bracket 334. The rear end portions of the tie rods 320 are maintained in predetermined space relation to each other by a vertical plate 342 which is bored to receive the tie rods.

The plastic injection cycle is terminated by the operation of a microswitch 3LS (FIG. 10) mounted on a shelf 344. The push button of the microswitch is arranged in contiguous relation to a spring plate 346 the right end portion of which, as seen in FIG. 9, is secured to a fixed upright 348 and the left end portion of which is mounted for forward and rearward movement on an arm 350 fixed to the bottom of the shelf 344, the forward end portion of the arm being bent upwardly to provide a stop for the forward movement of the spring plate 346. The central portion of the spring plate which, as shown in FIG. 9, bears against the plunger of the microswitch is offset forwardly from the opposite end portions and extended vertically for a purpose hereinafter set forth. For operating the microswitch 3LS a plunger 352 (FIG. 10) is mounted in an oversize bore 354 formed in the plate 34, said plunger being provided at its rear end portion with a head 356 which bears against the offset central portion of the spring plate 346. The plunger is positioned endwise relatively to the microswitch by the engagement of a nut 358 on the stem of the plunger with the rear face of the plate 34. The nut 358 is normally held against the plate 34 by a spring 360 surrounding the stem of the plunger, the forward portion of the spring bearing against a collar 362 secured to the stem and the rear portion of the spring bearing against a collar 364 slidably mounted on the stem and arranged to bear against the forward face of the plate 34. As shown in FIG. 10, the bottom mold member 64 is bored to receive the forward end portion of the plunger 352 and counterbored at 366 to receive the central portion of the plunger together with the collar 362, the spring 360 and the collar 364. Thus, it will be seen that when the mold member 64 is removed from the plate 34 the plunger 352 is not disturbed but remains in its position on the plate 34 shown in FIG. 10. The forward end face of the plunger 352, which is exposed within the mold cavity, is slightly inclined to conform substantially to the contour of the toe end portion of the bottom mold member 64. The plunger 352 is operated by the pressure of the fluid plastic in the mold cavity after the cavity has been completely filled. The operation of the plunger moves the spring plate 346 rearwardly to operate the microswitch 3LS thereby to terminate the plastic injection cycle. The vertical dimension of the central portion of the spring plate 346 is great enough to accommodate any changes in the position of the plunger 352 occasioned by differences in size or style of shoes to be operated upon by the illustrated machine.

Figure 12:
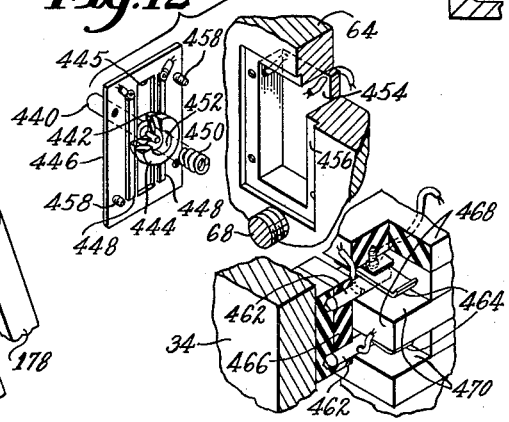
FIG. 12 is an angular view illustrating the parts of an alternative pressure switch mechanism separated from each other.

If it should be desired to mount the plunger for operating the switch 3LS in the heel portion of the bottom mold member 64 the assembly illustrated in FIG. 12 is substituted for the switch operating mechanism above described in order to obviate interference with the conveyor chain 22 and its mounting means. As shown in FIG. 12, a plunger 440, similar to the plunger 352 illustrated in FIG. 10, is arranged to be positioned in a suitable bore in the heel end portion of the bottom mold member 64. At its rear end the plunger carries a relatively thin disk 442 made of copper or any suitable electricity conducting material and a relatively thick disk 444 made of a non-conducting material. The plunger 440 is movable endwise through a slot 445 in a rectangular panel 446 of insulating material. Secured to the panel are two parallel strips of conducting material 448.

The switch comprising the strips 448 and the disk 442 operates in the same manner as the switch 3LS above referred to. The disk 442 is normally held in contact with the conductor strips 448 by a spring 450 seated in a socket 452 in the disk 444 and arranged to bear against the base of a rectangular recess 454 formed in the bottom mold member 64. A rabbet 456 is formed about the recess 454 to receive the switch assembly which is secured therein by screws 458. The strips 448 are wired to a pair of brushes 462 which engage conductor plates 464 when the ambulatory assembly comes to rest in the injection station. The illustrated brushes 462 are metal pins mounted in and projecting rearwardly from a block 466 of insulating material secured to any suitable portion of the plate 34. The conductor plates 464 are secured to plates 468 made of insulating material and incorporated in an assembly constructed and arranged to provide horizontal grooves 470 for the passage of the brushes 462 with the ambulatory assembly.

Referring to FIG. 6, the manually operated electrical switches and controls are mounted in an elongated box or cabinet 368 hung between two brackets 370 extending forwardly and upwardly from the lower portion of the machine frame. From right to left the illustrated switches and controls comprise a push button switch 4PB for starting the electric motor 58 (FIG. 5), a push button switch 5PB for stopping the motor, a switch 1SS for opening and closing a circuit to a solenoid hereinafter identified which operates the clutch connecting the motor to the plastic extruding auger, a switch 2SS in the circuit to the heating units, an emergency switch ES5 in the same circuit as 5PB, the control knob of a variable transformer VT2 for adjusting the voltage in the electrical current conducted to one of the heating units, a similar knob of another variable transformer VT3, a knob for adjusting a thermostat 3TH for determining the temperature of the cylinder 290, a knob for adjusting a thermostat 1TH for controlling the temperature in the casing 296 of the extruding assembly, an emergency switch ES4 in the same circuit as ES5 and 5PB, a push button switch 3PB, which is employed only when the plastic injecting operation is manually controlled as hereinafter described, and a switch 3SS which is operated to transfer the electrical organization from manual to automatic control, as hereinafter described. In the front of the switch box 368 are two push button switches 1PB (not shown) and 2PB which are operated simultaneously to start the conveyor assembly. Referring to FIG. 1, the relays incorporated in the electrical organization are all mounted in a box 372 mounted between the legs 374 at the right end portion of the machine frame. Referring to FIG. 3, most of the hydraulic valves, hereinafter described, are mounted on a panel 376 secured to the legs 378 at the left end portion of the machine frame.

The illustrated machine is designed for two different cycles of operation. In one of said cycles the machine operates continuously without any act on the part of the operator, after initiating the operation of the conveyor mechanism to index the ambulatory assembly from the loading station to the charging station, ending with the filling of the charging cylinder preparatory to the next mold charging operation. The operation of the conveyor mechanism advances into the loading station an ambulatory assembly carrying a shoe having a sole molded thereon and sufficiently cured to permit its removal from the mold assembly. While the machine is at rest the side molds are opened into their positions shown in FIG. 6 and the work supporting assembly is swung downwardly to permit the removal of the shoe from the form 108. Thereupon another lasted shoe, such as the shoe 106 illustrated in FIG. 6, is mounted on the work support. The side mold members are then closed and the work supporting assembly is swung upwardly to bring the shoe into registration with the mold cavity and the hand lever 174 is operated to clamp the shoe against the plates 66. Having determined that the shoe is properly registered with relation to the mold elements, the operator again initiates the operation of the conveyor mechanism to index the ambulatory assembly from the loading station to the charging station.

In the alternative operating cycle of the illustrated machine the machine comes to rest after the positioning of the ambulatory assembly relatively to the sprue nozzle preparatory to the mold charging operation. The remaining operations, beginning with the charging of the mold cavity and ending with the filling of the mold charging cylinder, are initiated by the operation of the push button switch 3PB. The alternative machine cycle is employed when it is desired to determine whether or not a suitable mating contact is made between the sprue nozzle and the plug in the sole mold member. This will occur mainly after removing one set of mold elements and substituting another set therefor. In the event that any leakage of fluid plastic occurs between the sprue nozzle and the plug the emergency switch ES4 is within easy reach of the operator to arrest the operation of the machine. A selector switch 3SS is provided for setting the electrical organization for one or the other of the two operating cycles above described.

Referring now to FIG. 14, illustrating diagrammatically the electrical organization of the illustrated machine, the electrical sequence is as follows: The switch 2SS (line 13) is manually operated to energize a control relay 5CR (line 13) to close normally open contacts 5CR (line 18). A control relay 7CR (line 14A) is energized through the closed switch 2SS and the normally closed contact 3CR (line 14) thereby closing the normally open contact 7CR (line 24) and energizing heating units H7, H8, H9 and H10 which apply radiant heat to the extruding assembly through a circuit including the now closed contacts 5CR and 7CR and the variable transformer VT3.

The closing of the switch 2SS also energizes a control relay 8CR (line 17A) through a normally closed thermostat contact 2TH (line 17A), this thermostat being incorporated in the block 294 (FIG. 7). The energizing of the control relay 8CR closes the normally open contact 8CR (line 20) energizing heating units H1, H2, H3, and H4 incorporated in the block 294, the circuit to the heating units extending through the now closed contacts 5CR and 8CR and through the variable transformer VT1 (line 20). The heating units H5 and H6 for the cylinder 290 (FIG. 7) are energized through the now closed contacts 5CR and the normally closed contact of a thermostat 3TH (line 20) incorporated in the cylinder 290.

When the extruding assembly has been heated to its operating temperature, the normally open contact of a thermostat 1TH (line 15) mounted in a bore 380 (FIG. 7) formed in a boss 382 on the extruder casing 296 closes, energizing the control relay 3CR (line 15) thus opening the normally closed contact 3CR (line 14) and deenergizing the control relay 7CR (line 14A), opening the contact 7CR (line 24) thus deenergizing the extruder heating units H7, H8, H9, and H10. The energizing of the control relay 3CR (line 15) causes the normally open contact 3CR (line 16) to close, thus energizing a control relay 4CR (line 16) and causing normally open contacts 4CR (lines 2 and 17) to close, thus closing a control circuit and a holding circuit. The closing of said control circuit energizes a solenoid 5S (line 4 and FIG. 13) to operate a pressurizing valve 400 (FIG. 13) of a later described hydraulic system including the motor 44, the circuit through said solenoid having incorporated therein the emergency stop switches ES1, ES2, ES3, ES4 and ES5. When the block 294 reaches its operating temperature the normally closed block thermostat contact 2TH (line 17A) opens thus deenergizing control relay 8CR (line 17A) and causing the closed contact 8CR (line 20) to open, thus deenergizing the block heating units H1, H2, H3 and H4. When the cylinder 290 reaches its operating temperature the normally closed cylinder thermostat contact 3TH (line 20) opens, thus deenergizing the cylinder heating units H5 and H6 (line 21). It will be understood that, for suitably energizing all of the material heating units, their thermostats permitting, and hence rendering the hydraulic conveyor motor 44 operative, actuation of the switch 2SS would normally only need to be done once, a few minutes prior to the start of each day's operations.

After the heating units have reached the temperature indicated by the adjustment of the thermostats the three-way selector switch 1SS (lines 3 and 11) is operated to close the contact 1SS in line 11, and the selector switch 3SS is set for the automatic operation of the machine from the initiation of the advancement of the conveyor to and including the refilling of the cylinder for the following injection cycle. The cylinder charging cycle of the machine is now initiated by the operation of the push button switch 4PB (line 2). The contact 4CR (line 2) being closed, the operation of switch 4PB energizes the motor starter 1M (line 2) and also closes a normally open contact 1M (line 3) to hold the motor circuit closed. Referring to FIG. 8, the motor operates the hydraulic pump 56 and the driving element of the clutch 282 through which the extruder 286 is operated. The control circuit and the extruder cut-out switch 1SS having been closed and the selector switch 3SS having been set for automatic operation, the closing of the push button switch 4PB (line 2) causes a clutch solenoid 4S (line 11) to operate the clutch 282 thus initiating the operation of the extruder. After the cylinder 290 is filled the plate 332 (FIG. 7) carried by the piston 292 engages and operates the limit switch 4LS (line 10) opening its normally closed side and thus deenergizing the clutch solenoid 4S to stop the extruder 286. The normally open side of the limit switch 4LS is now closed. The two push button switches 1PB and 2PB (line 6) are now operated to cause the conveyor mechanism to index the ambulatory assembly in the loading station to the injection station. The operation of said push button switches energizes the solenoid 1SV which operates the valve 406 to cause the operation of the hydraulic motor 44 (FIG. 5), thus effecting the operation of the conveyor mechanism. The operation of the push button switches energizes a relay 1CR (line 7) to close a normally open contact 1CR (line 7) thus to hold the solenoid 1SV energized after the push buttons are released. When the ambulatory assembly reaches the injection station it engages and operates a limit switch 1LS (line 7) to deenergize the solenoid 1SV (line 6) and the relay 1CR (line 7) thus opening the contact 1CR (line 7). Upon the deenergizing of the solenoid 1SV a spring returns the valve 406 (FIG. 13) to its initial position thus terminating the operation of the hydraulic motor 44 and causing the ambulatory assembly to come to rest in the injection station. The normally open side of the limit switch 1LS (line 7) has now been closed, energizing a relay 6CR (line 6A). The normally closed contact 6CR (line 6) opens and the three normally open contacts 6CR (lines 6A, 9 and 10) close. When the limit switch 1LS returns to its normal position the relay 6CR is held energized through the limit switch 3LS (line 8) and the now closed contact 6CR (line 6A). Referring to FIG. 9, the operation of the piston 238 to position the ambulatory assembly in the injection station closes two limit switches 2LS and 5LS (line 10). Thereupon the ambulatory assembly is swung rearwardly preparatory to the charging of the mold cavity. Such rearward movement of the assembly closes the limit switch 6LS (line 10) causing the energizing of a relay 2CR (line 8) thus closing the normally open contact 2CR (line 8) and providing a holding circuit for the operation of a solenoid 2S (line 10) and a solenoid 3S (line 9). The energizing of the solenoid 2S operates a valve V3 (FIG. 13) thus actuating the plastic injection piston 292 and the energizing of the solenoid 3S rocks a shaft 384 (FIG. 9) to open a gate valve in the sprue nozzle 214. At the beginning of the charging of the mold cavity the limit switch 4LS (line 10) returns to its normal position and the solenoids 2S and 3S are held energized through the normally closed switch 3LS (line 8) and the closed contact 2CR (line 8). After the mold cavity has been fully charged, sufficient pressure of the fluid plastic is developed therein to operate the plunger 352 thereby to open the normally closed limit switch 3LS (line 8) whereupon the relay 6CR (line 6A) is deenergized, the contact 6CR (line 6) closes and the other three contacts 6CR (line 6A, 9 and 10) open. Thus, the solenoid 2S and 3S are deenergized, terminating the operation of the injection piston and causing a spring 386 (FIG. 9) to close the gate valve. The illustrated spring is mounted on a link 388 connecting the solenoid 1SV to an arm 390 projecting radially from the shaft 270, the spring being confined between a washer 392 bearing against the headed end of the link and a washer 394 mounted on and movable endwise of the link and bearing against two fixed vertical plates one of which is illustrated in FIG. 9 and identified by the numeral 396. The deenergizing of the solenoid 2S permits a spring 398 (FIG. 13) to shift the valve 422 into its position shown in FIG. 13, thus terminating the mold charging operation. The relay 2CR (line 8) has now been deenergized, thus opening contact 2CR (line 8) and closing contact 2CR (line 11) thereby reenergizing the solenoid 4S (line 11) to operate the clutch 282, again initiating the operation of the extruder 286 to fill the injection cylinder 290. Upon the completion of the filling of the cylinder the limit switch 4LS is operated as hereinbefore described and the machine comes to rest with the various instrumentalities set for a repetition of the automatic cycle by the operation of the two push buttons 1PB and 2PB.

When the selector switch 3SS is set for manual control of the mold charging operation, the contact 3SS at the left, in line 9, is closed and the contact 3SS at the right, in line 9, is open, and consequently the relay 6CR is not energized in the course of the machine cycle as hereinbefore described, and the machine comes to rest with the sprue nozzle in mating engagement with the plug in the sole mold member preparatory to the mold charging operation. After the operator has determined that conditions are right for the mold charging operation, he depresses the push button switch 3PB (line 10), thus energizing the solenoids 2S and 3S to cause the sprue valve to open and the plastic injecting piston to operate. When the mold is filled, the limit switch 3LS is opened, as hereinbefore described, and the solenoids 2S and 3S are deenergized to terminate the operation of the injection piston and to close the valve and the sprue nozzle. The remaining steps in the cycle to reset the machine for the next cycle of operations are the same as hereinbefore described.

The operation of any one of the emergency stop switches ES1 to ES5 deenergizes the solenoid 5S (line 4) thus arresting the operation of the machine but leaving the control circuit energized. The machine will resume its operation from the point where it was arrested upon the closing of the opened emergency stop switch and the operation of the push button switch 4PB (line 2).

The safety switch 1SW (line 6) is provided for the safety of the operator when he is inserting the lead end of a plastic tape into the tape receiving opening in the extruder casing or doing any work that requires his presence near the conveyor mechanism. The operation of the switch 1SW opens the circuit through the push button switches 1PB and 2PB (line 6), thus preventing the operation of the conveyor mechanism.

Referring now to FIG. 13, illustrating diagrammatically the hydraulic organization, the operation of the solenoid 5S by the thermostatically controlled electrical means above described moves the valve 400 to the right, as seen in FIG. 13, thus closing a normally open pilot line to the main relief valve 460 and thereby rendering the spring 461, incorporated in the relief valve, effective to cause the pressurizing of the hydraulic system in accordance with the setting of the relief valve 402.

Pressure fluid flows through a reducing valve 404 which reduces the pressure to 275 p.s.i. and thence through a valve 406 to the cylinder 240, thus operating the levers 226 which position the ambulatory assembly relatively to the sprue nozzle. Pressure then builds up in a sequence valve 408, opening said valve to permit the flow of pressure fluid to the cylinder 258, whereupon the piston 256 is operated to swing the ambulatory assembly rearwardly into engagement with the sprue nozzle. The push button switches 1PB and 2PB are now operated thus energizing the solenoid 1SV to shift the valve 406 to the right, as seen in FIG. 13, opening a circuit for the passage of pressure fluid to the cylinders 240 and 258, thus retracting the levers 226 into their positions illustrated in FIG. 13 and swinging the ambulatory assembly forwardly to disengage it from the sprue nozzle. After the pistons 238 and 256 have been fully retracted pressure builds up sufficiently to cause the flow of pressure fluid through a needle valve 410 and thence to the motor 44 which operates the conveyor mechanism. The illustrated motor comprises a paddle 412 fixed to the shaft 48 mounted in a casing 416, the paddle being operable from its position illustrated in FIG. 13 in which it is in engagement with the left side face of a stop 418 in a counterclockwise direction into a position in which it is spaced from the right side face of said stop. Pressure fluid flowing from the valve 410 enters the motor 44 at the left of the stop 418, as seen in FIG. 13, rotating the paddle 412 in a clockwise direction, thus operating the conveyor mechanism to advance an ambulatory assembly from the loading station to the injection station and to advance the other seven ambulatory assemblies in the illustrated machine to the same extent along their path of movement. When the ambulatory assembly advancing from the loading station reaches the injection station it operates the limit switch 1LS thus deenergizing the solenoid 1SV and permitting a spring 420 to shift the valve 406 to the left, as seen in FIG. 13. Thereupon, pressure fluid flows through the valve 406 to the right end of the cylinder 240 operating the piston 238 to actuate the levers 226, thus predeterminedly positioning the ambulatory assembly relatively to the sprue nozzle. After sufficient pressure is built up in the system to overcome the spring 54 (FIG. 5) the paddle 412 in the motor 44 is rotated counterclockwise back to its position shown in FIG. 13, the ratchet 50 operating idly relatively to the ratchet 52 on the sprocket shaft 38. Pressure fluid then flows through the sequence valve 408 and thence to the right end of the cylinder 258 operating the piston 256 to swing the ambulatory assembly rearwardly into contact with the sprue nozzle. The solenoid 2S is now energized automatically or by the operation of the push button switch 3PB depending upon the setting of the selector switch 3SS. The energizing of the solenoid 2S shifts a valve 422 to the right, as seen in FIG. 13, thus pressurizing a line to the pilot 424 of the valve 426, shifting the valve to the left, as seen in FIG. 13, thus causing the flow of pressure fluid to a pilot 428 of a valve 430, shifting said valve to the left, as seen in FIG. 13, and causing the flow of fluid directly from the pump to the injection cylinder 328, by-passing the relief valve 402. The pressure in the system is now controlled by a main relief valve 460 which is set for 1500 p.s.i. A check valve 432 is inserted into the pressure line to the injection cylinder in order to prevent the piston 238 and cylinder 240 from reacting to a sudden increase in pressure at the initiation of the injecting operation. Upon the completion of the charging of the mold cavity the pressure of fluid plastic in the mold cavity builds up sufficiently to operate the switch 3LS which deenergizes the solenoid 2S permitting a spring 398 to shift the valve 422 to the left as seen in FIG. 13, thus connecting the pilot 424 to an exhaust line whereupon a spring 436 shifts the valve 426 to the right, as seen in FIG. 13. Pressure fluid then flows to a pilot 438 of the valve 430 thereby shifting said valve to the right as seen in FIG. 13, whereupon the injection piston 326 is returned to its position illustrated in FIG. 13.

Having thus described our invention, what we claim as new and desire to secure by Letters Patent of the United States is:

1. In a plastic injection molding machine having means including a piston and an injection nozzle for charging a mold cavity with fluid material, the combination of a carrier for mounting any one of a plurality of mold assemblies, a power operated conveyor for advancing the carrier from a loading station to an injection station, a pair of carrier positioning levers fulcrumed for opposite movement to position the mold assembly on the carrier in confronting relation to the injection nozzle while spaced therefrom, a pair of abutment members for determining the operating position of said levers, respectively, means operating upon the completion of the positioning movement of said levers to cause the carrier to swing on a horizontal axis thereby to bring the mold assembly thereon into communication with the injection nozzle, and means operating upon the completion of such swinging movement of the carrier for causing the piston to inject a charge of fluid material into the mold cavity.

2. In a plastic injection molding machine having means including a piston and an injection nozzle for charging a mold cavity with fluid material, the combination of a vertically disposed carrier for advancing a mold assembly from a loading station to an injection station, a rail on which the carrier runs, a plurality of rolls at the upper extremity of the carrier for supporting it in depending relation on said rail, a pair of guide rolls mounted at the lower extremity of the carrier, a pair of guide rails between which the guide rolls run, a pair of carrier positioning levers fulcrumed beneath the guide rails for opposite movement into position to engage the guide rolls thereby to position the carrier in confronting relation to the nozzle while spaced therefrom, a pair of abutment members for determining the operating positions of the levers, respectively, and an actuator for swinging the carrier on an axis defined generally by the engagement of the guide rolls with the guide rails into a position in which the mold assembly is in communication with the nozzle.

3. In a plastic injection molding machine having means including a piston and an injection nozzle for charging a mold cavity with fluid material, the combination of a vertically disposed carrier for mounting any one of a plurality of mold assemblies, a power operated conveyor for advancing the carrier from a loading station to an injection station, a rail upon which the carrier runs, a plurality of rolls at the upper extremity of the carrier for supporting it in depending relation on said rail, a pair of carrier positioning levers fulcrumed for opposite movement to position the carrier in confronting relation to the injection nozzle while spaced therefrom, a pair of abutment members for determining the operating positions of the carrier positioning levers, respectively, a first limit switch operated by the carrier for arresting the operation of the conveyor when the carrier arrives at the injection station, an actuator for swinging the carrier on an axis defined generally by the lower extremity of the carrier into a position in which a mold assembly mounted in the carrier is in communication with the injection nozzle, a second limit switch operated by the carrier positioning movement of the levers for initiating operation of the actuator, and a third limit switch operated by the actuator for initiating the operation of the piston to inject a charge of fluid material into the mold cavity.

4. In a plastic injection molding machine having means including an injection nozzle for charging a mold cavity with fluid material, the combination of a vertically disposed carrier for advancing a mold assembly from a loading station to an injection station, a rail on which the carrier runs, a plurality of rolls at the upper extremity of the carrier for supporting it in depending relation on said rail, and a guide roll at the upper extremity of the carrier constructed and arranged to run in a groove in said rail and thus to hold the carrier against displacement widthwise of the rail, said groove being widened at the injection station to permit movement of the carrier in a direction widthwise of the rail to and from a position in which the mold assembly is in communication with the nozzle.

5. A plastic injection molding machine having means including an injection nozzle for charging a mold cavity with fluid material, the combination of a vertically disposed carrier for advancing a mold assembly from a loading station to an injection station, a rail on which the carrier runs, a plurality of rolls at the upper extremity of the carrier for supporting it in depending relation on said rail, a guide roll at the upper extremity of the carrier constructed and arranged to run in a groove in said rail and thus to hold the carrier against displacement widthwise of the rail, said groove being widened at the injection station to permit movement of the carrier in a direction widthwise of the rail to and from a position in which the mold assembly is in communication with the nozzle, a pair of guide rolls mounted at the lower extremity of the carrier, means determining a path of movement of said guide rolls, and an actuator at the injection station for swinging the carrier on an axis defined generally by the engagement of the guide roll with said guiding means into a position in which the mold assembly is in communication with the nozzle.

6. In a plastic injection molding machine having means including a piston and an injection nozzle for charging a mold cavity with fluid material, the combination of a vertically disposed carrier for mounting any one of a plurality of mold assemblies, a power operated conveyor for advancing the carrier from a loading station to an injection station, a rail upon which the carrier runs, a plurality of rolls at the upper extremity of the carrier for supporting it in depending relation on said rail, a guide roll at the upper extremity of the carrier constructed and arranged to run in a groove in said rail thereby to hold the carrier against displacement widthwise of the rail, said groove being widened at the injection station to permit movement of the carrier widthwise of the rail to and from a position in which the mold assembly is in communication with the nozzle, a pair of guide rolls mounted in the lower extremity of the carrier, a pair of guide rails between which the guide rolls run, a pair of carrier positioning levers fulcrumed beneath the guide rails for opposite movement into engagement with the guide rolls thereby to position the carrier in confronting relation to the nozzle while spaced therefrom, a pair of abutment members for determining operating positions of the levers respectively, and an actuator for swinging the carrier on an axis defined generally by the engagement of the guide rolls with the guide rails within limits determined by the width of the widened portion of the groove in which the guide roll operates thereby to bring the mold assembly into communication with the nozzle.

References Cited in the file of this patent

UNITED STATES PATENTS

| | | |
|---|---|---|
| 2,318,031 | Tucker | May 4, 1943 |
| 2,333,056 | Thoreson et al. | Oct. 26, 1943 |
| 2,402,805 | Cousino | June 25, 1946 |
| 2,470,402 | Jobst | May 17, 1949 |
| 2,518,594 | Blanchard et al. | Aug. 15, 1950 |
| 2,668,325 | Goodwin | Feb. 9, 1954 |
| 2,732,584 | Bishop | Jan. 31, 1956 |
| 2,765,491 | Magerkurth | Oct. 9, 1956 |
| 2,786,234 | Beyer | Mar. 26, 1957 |
| 2,787,022 | Chisholm | Apr. 2, 1957 |
| 2,840,854 | Sherman | July 1, 1958 |
| 2,853,735 | Cooke et al. | Sept. 30, 1958 |
| 2,885,734 | Wucher | May 12, 1959 |
| 2,892,214 | McCarthy | June 30, 1959 |
| 2,939,176 | Adelman | June 7, 1960 |

FOREIGN PATENTS

| | | |
|---|---|---|
| 215,758 | Australia | Nov. 14, 1957 |